United States Patent [19]

Zurecki et al.

[11] Patent Number: 5,066,513
[45] Date of Patent: Nov. 19, 1991

[54] METHOD OF PRODUCING TITANIUM NITRIDE COATINGS BY ELECTRIC ARC THERMAL SPRAY

[75] Inventors: Zbigniew Zurecki, Macungie; Edward A. Hayduk, Jr., Blandon; John G. North, Pottstown; Robert B. Swan, Bath, all of Pa.

[73] Assignee: Air Products and Chemicals, Inc., Allentown, Pa.

[21] Appl. No.: 477,400

[22] Filed: Feb. 6, 1990

[51] Int. Cl.⁵ ............................ B05D 3/06; B05D 1/04
[52] U.S. Cl. ................................... 427/37; 427/34; 427/423; 427/126.1
[58] Field of Search ................ 427/37, 35, 126.1, 34, 427/423; 428/908.8

[56] References Cited

U.S. PATENT DOCUMENTS 4,333,962  6/1982  Pullker et al. ..................... 427/37
4,836,865  6/1989  Sakakima et al. ................. 148/306

FOREIGN PATENT DOCUMENTS 62-180058  8/1987  Japan .
63-195260  8/1988  Japan .

Primary Examiner—Shrive Beck
Assistant Examiner—Roy V. King
Attorney, Agent, or Firm—James C. Simmons; William F. Marsh

[57] ABSTRACT

Wear resistant surfaces can have their service life increased by being coated with a titanium nitride based coating applied by the electric arc thermal spray process using at least one pre-nitrided titanium feed wire and nitrogen in the arc spray gun.

7 Claims, 2 Drawing Sheets

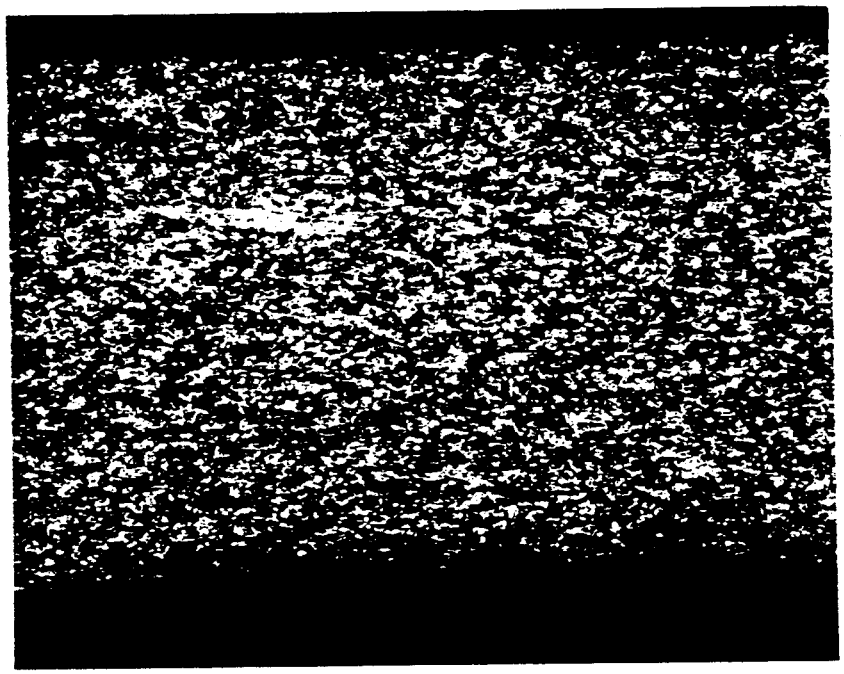
FIG. 2 AS SUPPLIED Ti WIRE (50x, ETCHED)
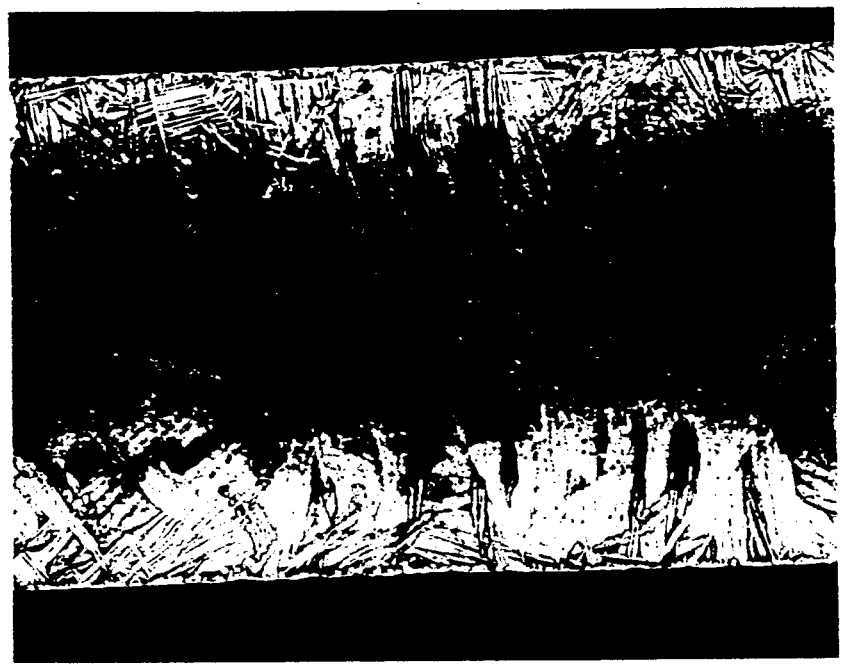
FIG. 3 PRE-NITRIDED Ti WIRE (50x, ETCHED)

METHOD OF PRODUCING TITANIUM NITRIDE COATINGS BY ELECTRIC ARC THERMAL SPRAY

FIELD OF THE INVENTION

The present invention pertains to industrial articles such as screens for cominution devices which are normally subject to mechanical wear during use and methods for extending the service life of such parts.

BACKGROUND OF THE INVENTION

Throughout all of the industrial sectors of the world many mechanical devices are subjected to wear caused by abrasion, erosion, and/or corrosion during their normal service life. Billions of dollars are spent by industry to replace components which fail prematurely because of excessive wear in inert and corrosive service environments. Many parts may be made to last longer if they were manufactured from harder, corrosive resistant materials however, the cost of doing so is often prohibited and can mean the difference between a successful operation and a unsuccessful operation because of excessive costs.

A number of methods are available for surface hardening or depositing corrosion and wear resistant materials on industrial parts. The oldest known methods are diffusion treatments, nitriding and carburizing of ferrous based materials. The disadvantage in using these techniques is that they involve subjecting the parts to elevated temperatures. Apart from the high costs associated with the energy and operation time, subjecting a part to elevated temperatures can cause size changes and loss of mechanical properties which would render the part unsuitable for use and/or would require a further heat treating operation and a subsequent cleaning operation to be performed after the surface treatment.

Electroplating, most commonly used to produce hard chromium or nickel coatings, involves cleaning the parts to be coated to a high degree and involves toxic solutions which are costly when disposed of in an environmentally safe manner.

Chemical and physical vapor deposition of coatings require high capital investment, high processing costs and are limited to very thin coatings and small parts. Of the thermal spray deposition methods which can be used to coat parts of unlimited size with coatings of unlimited thickness flame spraying often yields a porous coating with oxide inclusions.

Plasma spraying especially if performed in a vacuum or atmosphere chamber, will yield dense homogeneous coatings but is expensive and therefore limited in use.

High velocity detonation guns can deposit dense ceramic coatings on substrates but the equipment, feed powders and processing are very expensive.

Electric arc spraying with inert gases can produce dense, homogeneous coatings which bond well to a variety of substrate materials. Arc-sprayed titanium nitride which does not require high enthalpy flame is a cold process compared to the high heat input plasma and flame spray processes which can damage or distort the substrate material. Furthermore, the capital equipment and operating costs are less than one-half that of the plasma high velocity spraying methods and about order of magnitude less than that of the chemical vapor deposition. In electric arc spray of titanium nitride type coatings, disclosed in this invention, the surface to be coated requires no special preparation other than grit blasting.

SUMMARY OF THE INVENTION

In order to provide improved wear life for a part normally subject to abrasion, erosion and/or corrosion during use, it was discovered that a titanium nitride coating can be applied by the electric arc thermal spray coating process, wherein nitrogen is used as the propellant (atomizing) gas and a titanium wire as the feed material. Pre-nitriding the titanium wire results in a coating that is even harder and more wear resistant than would be found if the substrate were coated without having pre-nitrided the titanium wire. The invention includes coatings nitrogen arc sprayed using two different wire materials if at least one of them is titanium wire.

BRIEF DESCRIPTION OF THE DRAWING

FIG. 2 is a photomicrograph of the structure of titanium wire before treatment.

FIG. 3 is a photomicrograph of the structure of titanium wire after pre-nitriding.

DETAILED DESCRIPTION OF THE PREFERRED EMBODIMENT

Figure 1:
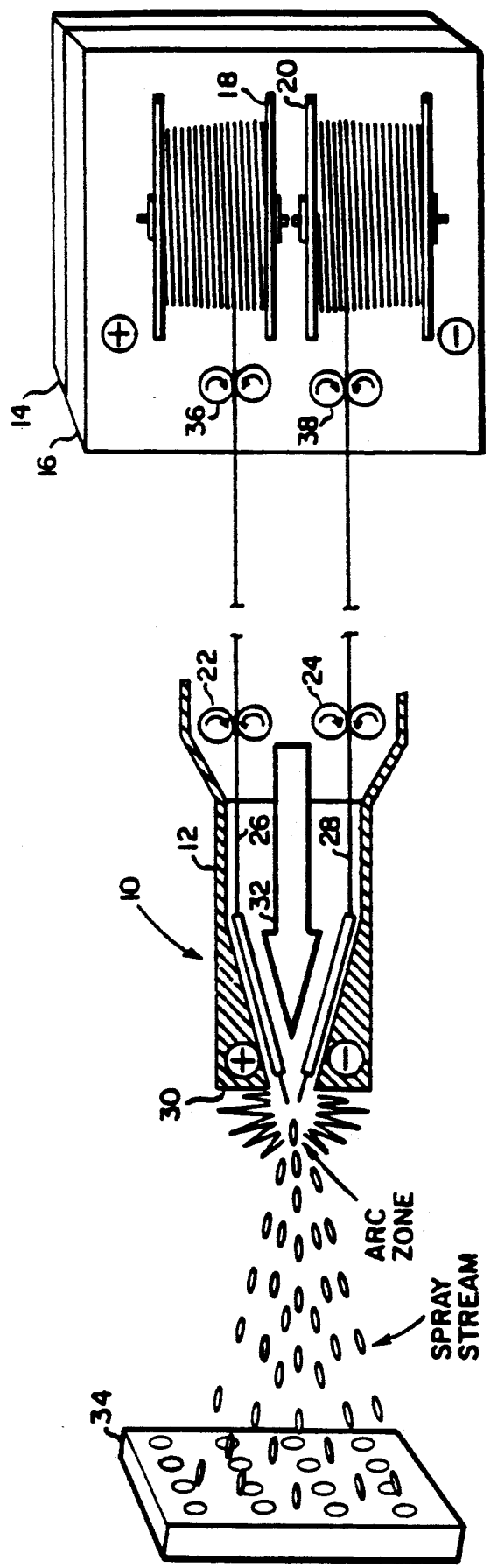
FIG. 1 is a schematic representation of a typical electric arc spray system employed to make the articles and practice the process of the present invention.

Increasing the service life of a part normally subjected to mechanical wear during use can provide a manufacturer and user with significant cost savings. For example, in the grinding of materials such as rubber and plastics for reformulating into compounds, doubling the service life of the screens used to classify the material in the impact mill (e.g., Hammermill) would be a significant benefit.

One method of enhancing the wear resistance of industrial parts would be to deposit a titanium nitride coating on the surfaces of the parts that are subject to wear. It has been discovered that if the electric arc spray process is used to apply such coatings and high purity nitrogen is substituted for air as a propelling gas the titanium wire is melted and the titanium is nitrided with minimum oxidation between the arc spraying device and the substrate to deposit a titanium nitride coating. The arc spray process can be used without an atmosphere chamber or a furnace or subsequent nitriding of the coating. A particularly effective coating is achieved if the titanium wire is nitrided prior to being used in the electric arc spray device.

The nitrogen used as the propelling (atomizing) gas during the electric arc thermal spray process reacts with the titanium feed wire to produce the titanium nitrogen compound in flight. As the molten droplets land on the surface of the article being coated they solidify thus forming a hard titanium nitride base coating that protects against wear and corrosion.

Electric arc spraying of a titanium coating utilizing nitrogen as a propelling gas is inexpensive as compared to deposition by plasma, high velocity combustion spraying, chemical vapor deposition and physical vapor deposition techniques. In addition, titanium nitride and titanium oxide are non-toxic as compared to chromium and nickel-phosphorous used in other hard facing techniques, thus the coating is suitable for use in food processing equipment. Furthermore, arc spraying takes minutes rather than hours that may be required for other processes, leaves no toxic byproducts and requires a minimal capital investment.

As shown in FIG. 1 of the drawing, the arc spray system 10 includes an arc gun 12, a constant voltage power source 14, a control console 16 and a wire feed device represented by wire spools 18 and 20 respectively. The arc spray gun 12 includes two sets of feed rollers 22, 24 to move separate wires 26, 28 respectively, through the gun to the nozzle end 30 where due to electrical current of different polarities (e.g., as shown in the drawing) an arc is struck between the wires 26 and 28. As the wires melt due to the influence of the electrical arc, compressed nitrogen gas is introduced into the arc on 12 as shown by the arrow 32. The nitrogen gas exists the nozzle 30, where it causes the molten metal to be broken up into a stream of droplets. The compressed gas, in addition to atomizing the metal, propels the atomized metal (spray stream) toward a substrate 34 such as a conventional Hammermill screen 34. During aerial traverse of the atomized titanium, reaction with nitrogen forms a titanium nitride compound.

The substrate 34 can be mounted vertically or horizontally and either it or the arc gun 12 can be oscillated to provide a uniform coating over the length of the electrode.

Wire feeders 18 and 20 can also include a pair of rollers 36, 38 to help feed the wire from the spools to the gun 12. The feed rolls in the gun and the wire feeds can either push, pull or use a combination of both techniques to move the wire through the arc gun 12.

It was found that while a conventional titanium nitride coating placed on the substrate by the thermal arc spray process using titanium wire and nitrogen gas produced coatings of enhanced wear resistance, if the as-received titanium wire was pretreated to increase the nitrogen content the resultant coating was harder and the life of the parts in service was increased.

The titanium wire pre-treatment was developed when it was realized that $N_2$-sprayed $Ti_xN$ coatings were both nitrogen (N) deficient and prone to in-flight oxidation. There were two additional reasons for wire pre-treatment: (1) as-supplied Ti-wires were difficult to feed through arc-spray gun conduits, and a nitride coating on the wires was discovered to lower the wire feed-friction, (2) post-deposition nitrogen annealing of arc-sprayed $Ti_xN$ may not always be possible; some substrates may be sensitive to elevated temperatures and/or an excessively large mismatch may exist between thermal expansion coefficients of the $Ti_xN$ coating and substrate that will damage the coating, (e.g. $Ti_xN$-coating on st. steel-substrate).

The Experiments included selection of annealing conditions for Ti-wires, sprayability tests with the annealed wires, and evaluation of the coatings sprayed with the annealed wires. TABLE 1 below presents the selection process. The third step annealing was found to be optional and used for testing. The different microhardness (e.g., 269 vs. 150 VHN) on the cross-section of the $N_2$ annealed and initially 'hard' and 'soft' Ti-wires indicates that $N_2$ annealing can be at temperatures higher than 1000° C. TABLE 2 shows the 8-fold [N] pickup in the Ti-wire resulting from our 1000° C. $N_2$ annealing.

TABLE 1

Tests for Selection of N2 Annealing Conditions
J&W Belt Furnace, 25-29 Minutes Treatment Time in Hot Zone, Dry House Gases

| Step | Condition | Objectives | Results |
|---|---|---|---|
| #1 | N2-10% H2 @ 1000° C. | Weaken the Ti-oxide film on Ti-wire with H2 and speedup the N2 diffusion into wire | Totally brittle wires, both the hard and the soft one; wire deformation is impossible |
| #2 | N2-pure @ 800° C. | Prevent the observed Ti-wire embrittlement | Both (H/S)* Ti-wires didn't change color or mech. properties |
| #3 | N2-pure @ 1000° C. | Increase Ti-nitriding kinetics but give up on the H2-activation of the wire surface | Both (H/S) Ti-wires exhibited yellow (TiN color) and a thin, uniform, smooth nitride developed on the wires |

*H/S, i.e. 'hard' and 'soft' Ti-wires, were two different types of the as-supplied feed material that was used throughout the tests. Both the materials were pure Ti, and the hardness difference resulted from the different degree of annealing at the end of the drawing process at the wire manufactures' site.

TABLE 2

Nitrogen Content in As-Supplied and N2-Treated Ti (soft) Wire
J&W Belt Furnace, 25-29 Minutes Treatment Time in Hot Zone, N2-pure @ 1000° C.

| As-Supplied | N2-Treated |
|---|---|
| 91 wppm | 790 wppm |

Initially sprayability tests showed that despite a yellow nitride post-annealing (nitride treated) coating, the $N_2$-treated Ti-wires can be melted, atomized, and deposited as well as the (untreated) as-supplied wires. Moreover, tests with continuously nitrogen annealed 'soft' wires show that the yellow nitride post-annealing coating actually smoothened the wire feeding into the gun which greatly improved the arc stability during the spraying.

$Ti_xN$ coatings were deposited using the $N_2$ annealed wires and compared to the coatings produced previously using the as-supplied wires and/or the $N_2$ post-deposition annealing. The appearance, surface roughness, self-bonding ability, and adhesion to the substrate (bend test) of the new coatings were the same as in the case of the coatings deposited in the past. However, the Knoop microhardness measurements revealed significant differences between the coatings. In the case of the 'hard' Ti feed wire, the coating deposited using the $N_2$ annealed wire was as hard as the coating which was applied by depositing essentially pure titanium followed by a post-deposition anneal in $N_2$ atmosphere. Both these coatings were much harder than the 'basic' coating produced with the as-supplied wire with no post-deposition annealing. Hardness of the $Ti_xN$ coating, produced with the $N_2$ annealed 'soft' Ti-wire, the highest in the series, was compared with those of the stainless and carbon steel substrates. The coating was 6.3 times harder than the stainless and 9 times harder than the carbon steel.

The $N_2$ wire pretreatment was found to improve hardness of the $Ti_xN$ coating by increasing the nitrogen content and improving the nitride stoichiometry (lower x). Nevertheless, the increased nitrogen content did not reduce the self-bonding ability of the $Ti_xN$ deposits.

Microhardness of the new coating is at least equivalent to that of the post-deposition annealed coatings, which makes the annealing of the coated parts unnecessary. Alternatively, both the pretreatment and post-deposition annealing steps can be used as two independent tools for the coating hardness control. It was also observed that the wire pretreatment improved the arc stability by lowering the wire friction in the gun conduits.

As to the wire, any technically pure, i.e. unalloyed, titanium wire with no special requirements or specs on purity levels, e.g. no spec. on Fe, V, etc. can be used. Typically, a technically pure titanium wire should have no more than 100 ppm of nitrogen (on wt. basis). Any titanium physical condition, e.g. soft, hard, or half-hard is acceptable.

FIG. 2 is a photomicrograph of the structure of a typical wire before treatment.

Pre-nitriding the wire should impart the following characteristics:
(a) develop a golden colored TiN film on the surface of the treated wire,
(b) increase nitrogen content, e.g. more than 500 ppm w/o,
(c) the core of the treated wire should remain metallic in order to preserve the flexibility of the wire required for the feeding of the arc-spray gun from the reels. This means, the top limit for the nitrogen content in the wire is 20% w/o.

As shown in FIG. 3 the microstructure of the pre-nitrided (annealed) wire should show coarse circular grain growth from the surface toward the core of the wire with corresponding degrees of hardness (VHN) from the surface to the core.

According to the present invention a uniform wear and corrosion resistant coating consisting primarily of titanium nitride can be deposited on a variety of substrate materials. The coating is deposited by electric arc spray using 0.062 or 0.030 inch diameter titanium wire that has been pretreated as set out above and nitrogen as the propelling (atomizing) gas. Nitrogen is substituted for high purity air as the propelling gas so that the titanium is further nitrided and oxidation is minimized. Two spools of titanium wire are feed at a constant rate into the gun 12 where they arc across at a potential difference of between 28 and 48 volts and 100-400 amps. Alternatively one spool of the wire may feed the spraying gun with another coating material which will form with the $Ti_xN$ alloyed for pseudo-alloyed coatings. This other material may include hard Fe, Cr, Ni, Mo, and W alloys and compounds as well as soft bonding non-ferrous metals and alloys. The coatings produced by the simultaneous use of the Ti and non-Ti wires offer lower hardness but higher impact resistance. The required spraying conditions remain unchanged. The nitrogen gas stream is feed to the nozzle at between 30 and 130 psig. The molten droplets react in flight with the nitrogen gas and form the titanium nitride coating on the substrate 34. The stand-off distance between the gun and a substrate is between 3 and 8 inches. The substrate is grit blasted before spraying in order to increase the strength of the mechanical bond between the coating and the substrate. The coating itself can be deposited to a thickness ranging from 0.001 inches to several inches in depth.

Coated parts have shown increased wear and corrosion resistance. Specifically, screens from Hammermills use to cryogenically grind rubber were coated under the above condition with three passes used to deposit a coating having a nominal thickness of 0.012 inches. Screens coated according to the invention have shown service lives between 2 and 10 times as long as uncoated screens. Corrosion exposure tests were performed by placing coated parts in seawater for extended periods of time with no apparent effect on the coating.

The titanium-nitrogen compound forming the coating which provides increased wear and corrosion-resistance over that of the metallic substrate can show a coating hardness in the range of between 860 to 1500 (VHN) micro hardness as measured by the Vickers method. This is harder by a factor of between 5 and 11 than the normal substrate materials.

The process of the present invention can be applied to any material that will accept a titanium nitride bonded coating. The coatings will be effective to increase the wear resistance and can be placed on the substrate by an economical method. In addition to Hammermill screens the process of the present invention was applied to an air-jet pulverizer which is used to grind metal salt material. Previous attempts by the user to grind a metal salt material have resulted in graying of the light material due to erosion of the interior surfaces of the mill. Coating a laboratory mill resulted in grinding of the salt material with no apparent contamination since there was no graying of the white material produced.

Wear clips from a centrifugal kelp processing machine were coated according to the present invention and were found to last twice as long as parts which the user had coated with tungsten carbide.

Having thus described our invention what is desired to be secured by Letters Patent of the United States is set forth in the appended claims.

We claim:

1. A method of improving the mechanical wear resistance of a substrate comprising the steps of:
exposing said substrate to an effluent from an electric arc thermal spray gun operated in the atmosphere using a pretreated titanium wire, said titanium wire being pretreated by annealing in nitrogen to increase the nitrogen content of the wire to at least 500 PPM, and a nitrogen gas as the atomizing/propelling gas, whereby a substantially titanium nitride coating is produced on said substrate.

2. A method according to claim 1 wherein said coating has a thickness of at least 0.001 inch.

3. A method according to claim 1 wherein the electric arc thermal spray gun is operated to produce a coating having a titanium to nitrogen ratio of between 1 and 2.

4. A method according to claim 1 wherein said electric arc thermal spray gun is operated with a current supply between 100 and 400 amperes.

5. A method according to claim 1 wherein the distance from the electric arc thermal spray gun to said substrate is set at the minimum spacing to prevent overheating of said substrate.

6. A method according to claim 4 wherein said spacing is between 3 and 8 inches.

7. A method according to claim 1 wherein said effluent from said electric arc thermal spray gun is formed using at least two feed wires with only one of the feed wires being titanium wire, and the other feed wire is made of Fe, Cr, Ni, Mo, W, lower melting point non-ferrous metals, and their alloys and ceramic or intermetallic compounds.

* * * * *